(12) United States Patent
Tong et al.

(10) Patent No.: US 6,505,835 B2
(45) Date of Patent: Jan. 14, 2003

(54) BRUSH SEALS AND METHODS OF FABRICATING BRUSH SEALS

(75) Inventors: Wei Tong, Clifton Park, NY (US); Zhang-Qing Zhuo, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 49 days.

(21) Appl. No.: 09/878,904

(22) Filed: Jun. 13, 2001

(65) Prior Publication Data

US 2002/0190473 A1 Dec. 19, 2002

(51) Int. Cl.$^7$ ................................................ F01D 11/02
(52) U.S. Cl. ..................... 277/355; 415/174.2; 415/231; 29/509
(58) Field of Search ........................ 277/355; 415/173.3, 415/173.5, 174.2, 174.5, 230, 231; 29/509, 888.3

(56) References Cited

U.S. PATENT DOCUMENTS

| | | | | |
|---|---|---|---|---|
| 4,730,876 A | * | 3/1988 | Werner et al. ............. | 140/92.2 |
| 4,884,850 A | * | 12/1989 | Greer ........................... | 269/40 |
| 5,183,197 A | * | 2/1993 | Howe .......................... | 228/160 |
| 5,474,306 A | * | 12/1995 | Bagepalli et al. ........... | 277/355 |
| 5,622,411 A | * | 4/1997 | Weihrauch ................... | 264/243 |
| 5,971,400 A | | 10/1999 | Turnquist et al. | |
| 6,109,616 A | * | 8/2000 | Mayr .......................... | 277/355 |
| 6,139,018 A | * | 10/2000 | Cromer et al. | |
| 6,161,836 A | | 12/2000 | Zhou | |
| 6,302,400 B1 | * | 10/2001 | Werner et al. ............... | 277/355 |
| 6,318,728 B1 | * | 11/2001 | Addis et al. ................. | 277/355 |

* cited by examiner

*Primary Examiner*—Anthony Knight
*Assistant Examiner*—Vishal Patel
(74) *Attorney, Agent, or Firm*—Nixon & Vanderhye

(57) ABSTRACT

The brush seal includes a plurality of bristles located in grooves along opposite sides of a single carrier. The grooves extend at a predetermined cant angle relative to radii of a sealing surface about which the brush seal extends. The grooves are formed between ribs which terminate in tips deformed to overlie the bristles in the groove and thereby retain the bristles on the carrier. An epoxy overlies the carrier surfaces and grooves to facilitate their retention. The brush seal may be fabricated by rolling knurled rollers with oblique cutting ribs along opposite surfaces of the carrier to form the grooves. The bristles are then wrapped about the carrier and in the grooves. Subsequently, the tips of the ribs defining the grooves are deformed to overlie and retain the bristles in the grooves.

20 Claims, 5 Drawing Sheets

BRUSH SEALS AND METHODS OF FABRICATING BRUSH SEALS

BACKGROUND OF THE INVENTION

The present invention relates in general to brush seals and methods of fabricating brush seals and particularly relates to bi-directional brush seals and methods of fabricating wherein accurate control of the bristle cant angle is maintained during manufacture and seal operation and enhanced reliability and improved sealing performance are provided.

Various types of brush seals have been proposed and utilized for various sealing purposes in turbomachinery such as generators and turbines and particularly at the stator-to-rotor interface. Conventional brush seal designs often comprise a bristle pack and a carrier structure for supporting the bristle pack. The bristle pack is an array, preferably in the form of a ring, of densely packed metal bristles or non-metallic (e.g., Kevlar) fibers (hereafter collectively referred to as bristles) projecting from a carrier for engagement with an opposing sealing surface. To facilitate bristle flexibility, e.g., for varying stator-to-rotor clearances and avoidance of excessive metal or fiber stress during rotor excursions, the bristles are arranged at an angle to both the radial and circumferential directions. The angle defined by a radial vector and the bristles is known as the cant angle.

Typically, the carrier structure is a ring or an arc of metal that holds the bristle pack. The carrier often consists of front and back plates for sandwiching the bristle pack between the plates, with the plates being welded along a margin or edge remote from the sealing surface. It will also be appreciated that a gap is typically provided between the front (upstream) plate and the bristle pack.

In brush seal fabrication, it is very difficult to control the bristle cant angle accurately while obtaining a fixed securement of the bristles to the carrier. It will be appreciated that the bristles normally have a very tiny diameter, usually ranging from 0.0028 inches to 0.006 inches and that the bristle pack density ranges from 1200 bristles per inch to 3000 bristles per inch. There is a current lack of techniques for handling the bristles effectively during fabrication of the brush seals and, accordingly, there is a need for an improved method of fabricating a brush seal while maintaining accurate control over the bristle cant angle and an improved brush seal.

BRIEF SUMMARY OF THE INVENTION

In accordance with a preferred embodiment of the present invention, there is provided a brush seal comprised of a single carrier for the bristles whereby a single array of bristles is applied to one surface of the carrier for projecting beyond an edge thereof into engagement with an opposing sealing surface. Preferably, arrays of brush bristles are secured along opposite surfaces of the carrier to project from an edge thereof into engagement with a sealing surface, the two arrays of bristles being spaced from one another at their tips. The bristles are disposed in grooves formed along one or opposite surfaces of a carrier, for example, a ring-shaped carrier. Particularly, grooves are accurately formed in those surfaces at a predetermined angle relative to the edge of the carrier opposite the prospective sealing surfaces. For example, where the carrier is circular about an axis, the grooves are formed at a predetermined cant angle relative to radii from the axis. The grooves are defined by ribs along these surfaces, terminating in tips straddling the grooves. With a plurality of bristles disposed in each groove, the tips of the ribs are deformed to overlie the grooves, retaining the bristles in the grooves with the bristle tips projecting from an edge of the carrier. Alternatively, or conjunctively, an epoxy is disposed along a surface of the carrier, e.g., within the grooves, to facilitate retention of the bristles in the grooves. A bi-directional brush seal is thus provided with bristle packs spaced axially one from the other. This enables sealing between high and low pressure regions on opposite axial sides of the seal is especially useful for cases in which the pressures at the two sides of the seal change periodically and, consequently, the leakage flow may proceed in either direction during operation.

To fabricate the brush seal, and assuming the carrier to be in the form of a ring about an axis, a knurling wheel with oblique cutting ribs on the surface of the wheel is forced into contact with the surface of the bristle carrier ring to form tiny, linearly extending grooves in the surface. It will be appreciated that a pair of such knurling wheels may be provided along opposite sides of the carrier ring to provide the grooves on those opposite surfaces at preferably identical cant angles. The dimensions of the groove are preferably less than a millimeter. It will be appreciated that the angle formed between a groove and a radii of the carrier ring is the same as the desired cant angle. Discrete bristles are then wrapped about the ring, for example, about the edge of the carrier opposite from the sealing surface, and laid into the grooves. The bristles laid in the grooves remain at the desired cant angle and project beyond the edge of the carrier. With the bristles in the grooves, a roller is forced into contact with the carrier surface or a pair of rollers are forced into contact with the opposed surfaces to deform the tips of the grooves to overlie the groove openings, thereby retaining the bristles in the grooves. To further prevent the bristles escaping from the grooves and to protect them during installation and operation, epoxy is provided along the bristle carrier surface(s). Alternatively, the epoxy may be coated along the carrier surface(s) and into the grooves to secure the bristles in the grooves.

It will be appreciated that in conventional brush seals, the bristle-free radial height is defined as the height from the seal "pinchpoint," where bristles are first constrained or pinched within the carrier, to the sealing surface, e.g., the surface of a rotating shaft where the brush seal is arcuate. To adjust the bristle-free radial height in accordance with the present invention, the surface and preferably opposite surfaces of the carrier ring can be recessed, for example, by machining a length of flat steps on the side surfaces of the carrier adjacent the edge from which the bristles project. Thus, free bristle portions extend from the tips of the bristles to the juncture of the bristles and the grooves and lie in spaced relation over the inset or flat steps.

In a preferred embodiment according to the present invention, there is provided a brush seal for sealing between adjacent surfaces comprising a brush seal carrier having an array of grooves spaced from one another along a surface thereof and ribs straddling the grooves, a plurality of bristles disposed in the groove between the ribs and having bristle tips projecting from the grooves beyond an edge of the carrier for sealing against a sealing surface and means carried by the carrier overlying the grooves and the bristles therein for securing the bristles and the carrier to one another.

In a further preferred embodiment according to the present invention, there is provided a brush seal for sealing between adjacent surfaces comprising a brush seal carrier having an array of grooves spaced from one another along a surface thereof and ribs straddling the grooves, the ribs terminating in tips adjacent outer ends thereof, a plurality of bristles disposed in the grooves between the ribs and having bristle tips projecting from the grooves beyond an edge of the carrier for sealing against a sealing surface and the tips of the ribs extending over the grooves to clamp the bristles in the grooves.

In a further preferred embodiment according to the present invention, there is provided a method of forming a brush seal having a carrier and a plurality of bristles, comprising the steps of (a) forming a plurality of grooves along a surface of the carrier, (b) locating the plurality of bristles in the grooves with tips thereof projecting beyond an edge of the carrier and (c) securing the bristles in the groove.

DETAILED DESCRIPTION OF THE INVENTION

Figure 1:
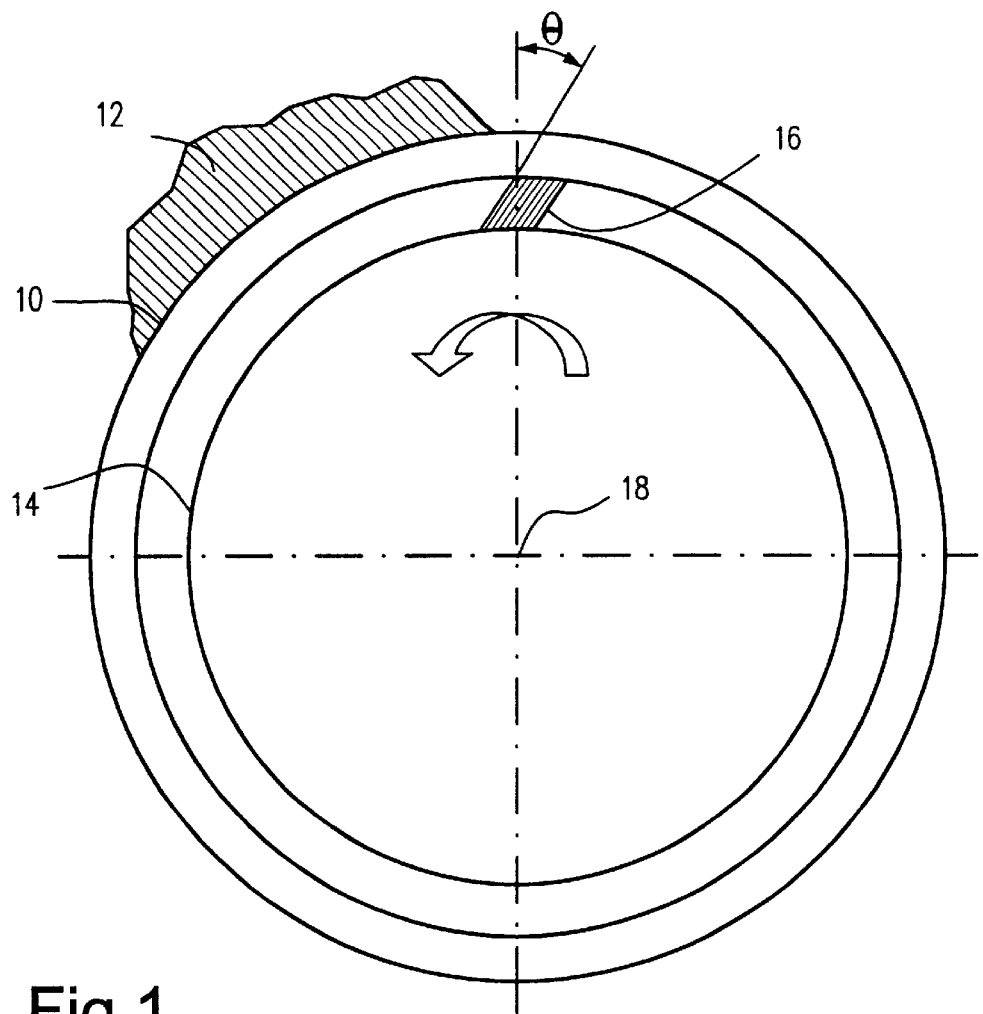
FIG. 1 is a schematic illustration of a prior art brush seal extending from a stationary component into engagement with a rotating component.

Referring now to FIG. 1, there is illustrated a carrier 10 forming part of a brush seal between a stationary component 12 mounting the carrier 10 and a rotating component 14, e.g., a rotating shaft. In FIG. 1, the bristles 16 of the brush seal extend at a cant angle θ which is defined by a radii from the center 18 of rotation and the longitudinal axis of the bristle.

Figure 2:
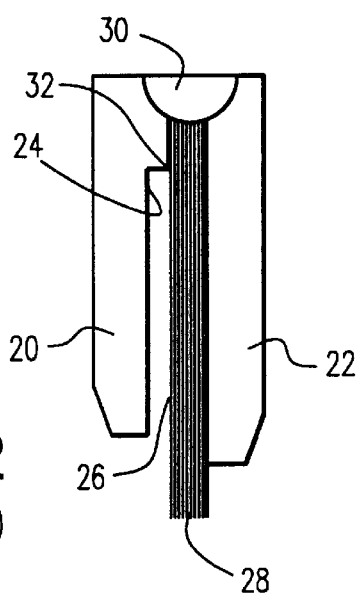
FIG. 2 is a cross-sectional view of a brush seal constructed in accordance with prior art.

Referring to FIG. 2, there is illustrated a conventional single-row brush seal construction. In FIG. 2, a plurality of bristles 26 are received between a front plate 20 and a back plate 22. That is, the bristles 26 are sandwiched between the plates 20 and 22 and have tips 28 which project from common edges of the plates for sealing engagement with a sealing surface, e.g., shaft 14. Typically, the plates as well as the bristles, are welded to one another at their radially outermost ends, for example, by a weld 30. Where non-metallic bristles are used, the plates may be glued together. The forward (upstream) plate 20 is inset or recessed at 24 to form a gap between plate 20 and the bristles 26. Also, FIG. 2 illustrates the pinchpoint 32 which corresponds to the location along the brush seal where the bristles are first constrained or pinched within the backing plates, the bristles otherwise extending freely to their tips 28.

Figure 3:
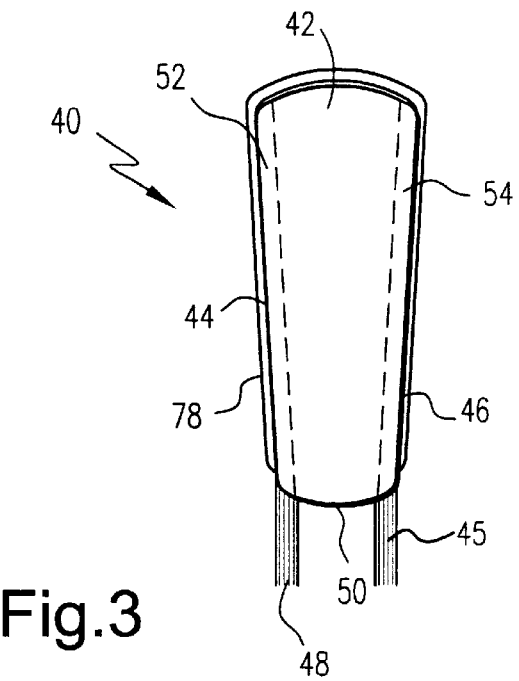
FIG. 3 is a cross-sectional view illustrating a brush seal constructed in accordance with a preferred embodiment of the present invention.

Referring to a preferred embodiment of the present invention illustrated in FIG. 3, a brush seal 40 is illustrated, comprised of a single carrier 42 and bristles 45 extending along opposite surfaces 44 and 46 of the carrier 42, terminating in free bristle portions having bristle tips 48. The tips 48 extend beyond an edge 50 of the carrier 42. In this preferred embodiment, a plurality of grooves 52 and 54, i.e., first and second grooves, are formed along respective opposite surfaces of the carrier 42. It will be appreciated that the carrier may extend linearly, have an arcuate or circular configuration or may have an irregular configuration. In any event, the discrete bristles 45 are wrapped about the carrier 42 and extend along opposite sides of the carrier 42 in the grooves 52 and 54 to project beyond the edge 50 of the carrier adjacent a sealing surface, e.g., shaft 14, so that the bristles tips 48 may engage the sealing surface. It will also be appreciated that the bristles may extend only along one side of the carrier and need not necessarily extend along opposite sides. By extending the bristles along opposite sides of carrier 42, however, the brush seal is bi-directional, i.e., capable of sealing either a positive or negative leakage flow across the seas. As noted previously, this is especially useful for cases in which the pressures at the two sides of the seal change periodically and, consequently, the leakage flow may proceed in either direction during operation.

Figure 4:
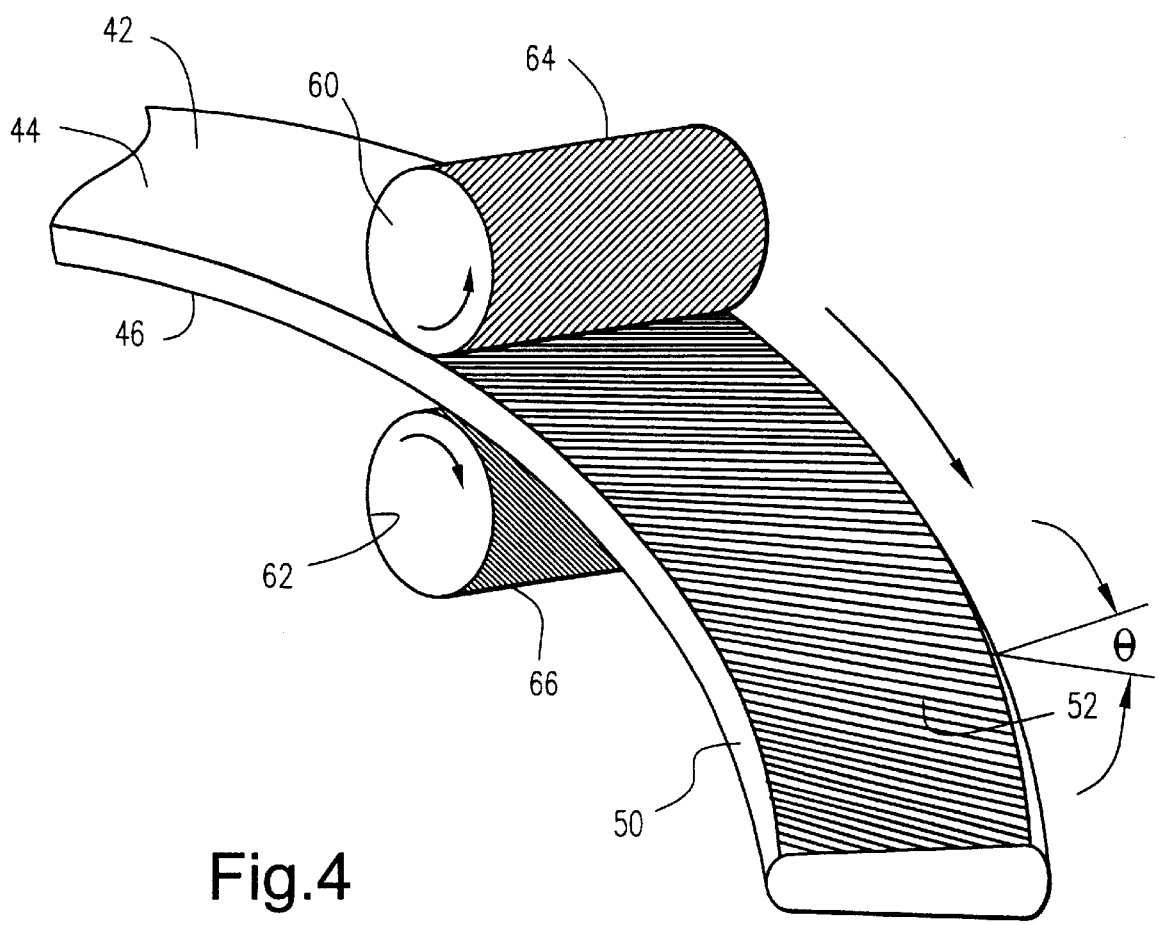
FIGS. 4–6 are fragmentary schematic perspective views illustrating various steps for fabricating the brush seal hereof.
Figure 5:
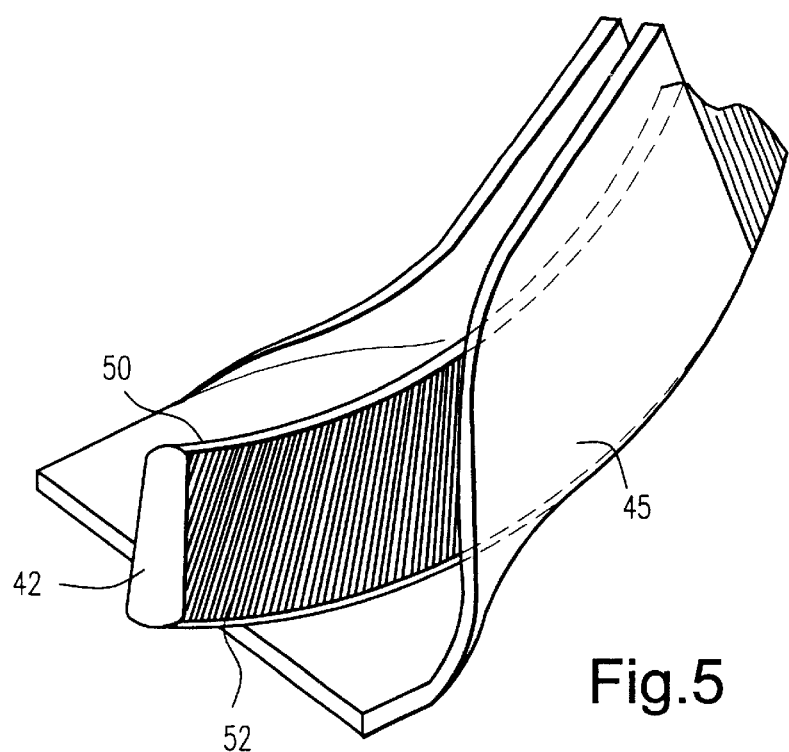
Figure 6:
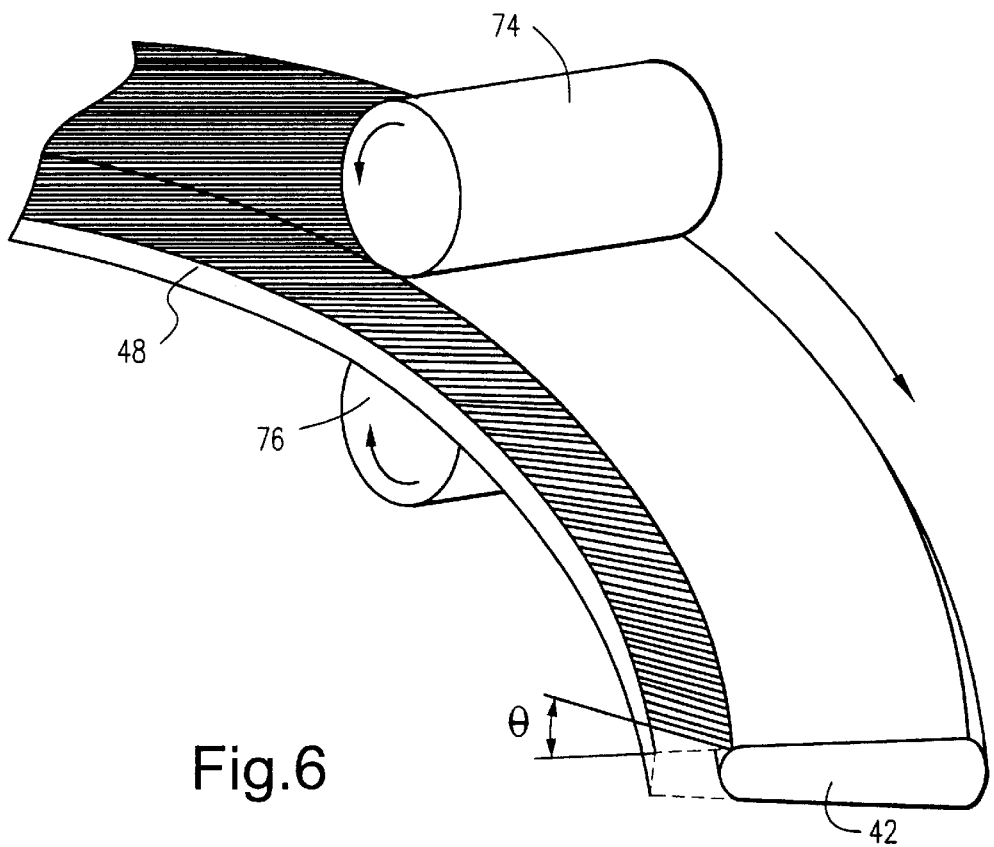

To fabricate the brush seal illustrated in FIG. 3, reference is made to FIGS. 4–9. In FIG. 4, there is illustrated the carrier 42, in this instance, in the form of an arcuate segment. A pair of knurling wheels 60 and 62 having oblique cutting ribs 64 and 66, respectively, are pressed into contact with the opposite surfaces 44 and 46 of carrier 42 to form tiny grooves 52 and 54 on the surfaces, respectively. The width dimensions of the grooves are less than a millimeter. In the instance where the brush seal is in an arcuate configuration about an axis, the angle formed between the groove and a radii relative to the axis is the desired cant angle θ. It will also be appreciated that the oblique cutting ribs 64 and 66 on the knurling wheels 60 and 62, respectively, form grooves 52 and 54 at corresponding cant angles on opposite sides of the carrier 42.

With the grooves formed along opposite sides of the carrier 42, the discrete bristles are wrapped about the carrier and laid into the grooves. To accomplish this, a wrapping or bending machine may be utilized to bend the discrete wires or non-metallic fibers forming the bristles about the carrier. Various types of wrapping or bending machines are available for wrapping or bending the bristles about the carrier and locating the bristles 43 in the grooves. Once the wrapping is complete, it will be appreciated that the bristle tips extend from the edge 50 of the carrier 42.

Figure 7:
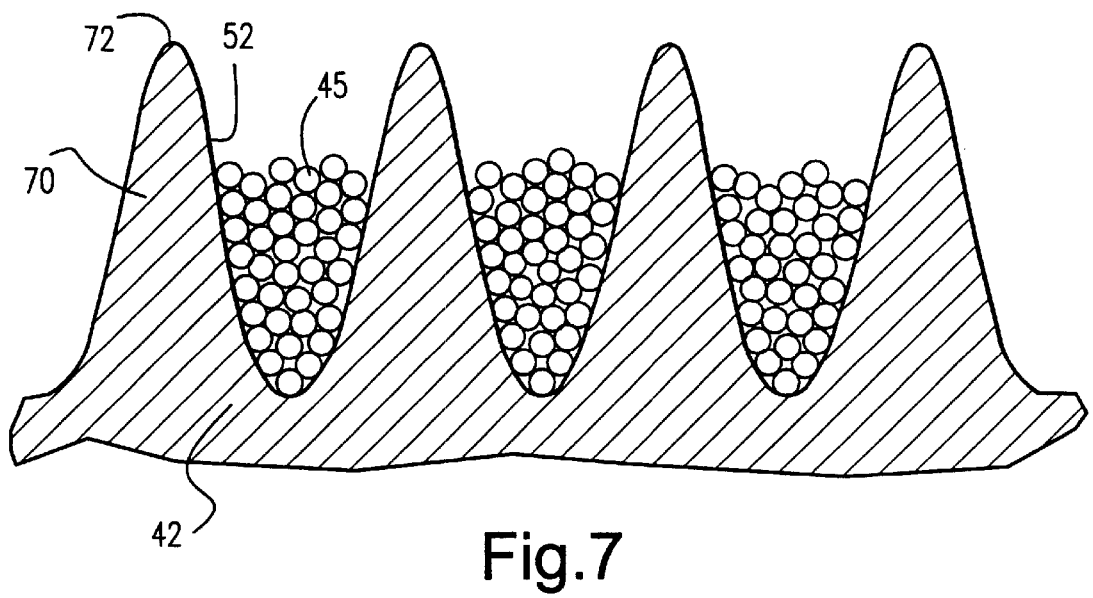
FIG. 7 is an enlarged fragmentary cross-sectional view of the grooves with bristles placed therein prior to their securement in the grooves.
Figure 8:
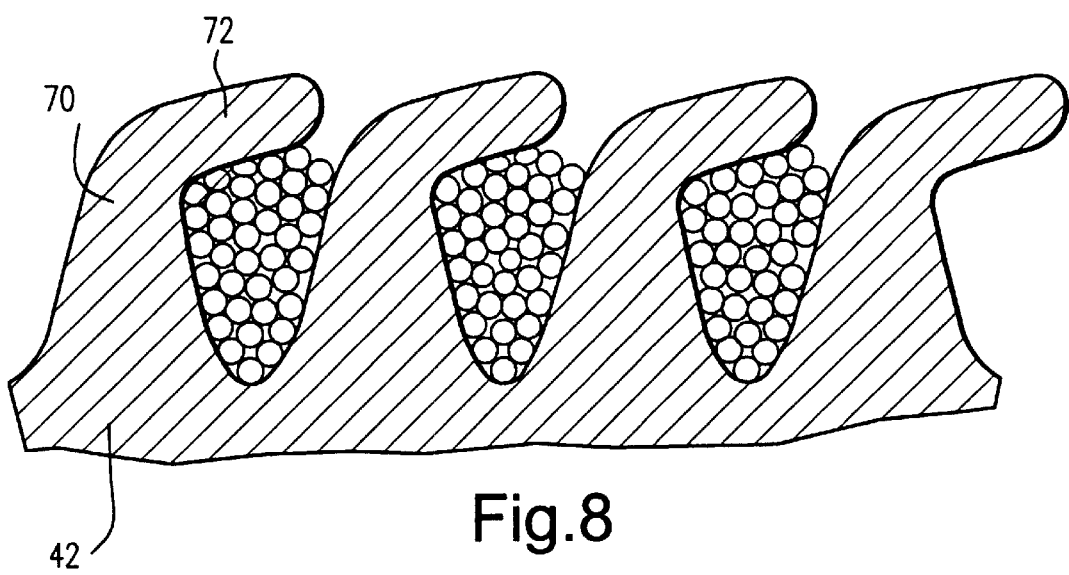
FIG. 8 is a view similar to FIG. 7 illustrating the tips of the ribs defining grooves deformed to retain the bristles in the grooves subsequent to the step illustrated in FIG. 6.

As illustrated in FIG. 7, the result of the wrapping of the bristles about the carrier and into the grooves is schematically illustrated. For example, the grooves 52 contain multiple bristles 45. It will be appreciated that the grooves 52 are defined in part by ribs 70 which terminate in tips 72 which project beyond the bristles contained in the grooves. Means are provided for securing the bristles and the carrier to one another. For example, the tips of the ribs 70 may be bent over to substantially close the grooves, locking the bristles from movement within the grooves. To accomplish this, a pair of smooth rollers 74 and 76 (FIG. 6) are applied to the tips 72 to deform the tips in the same direction as illustrated in FIG. 8. By flattening the tips 72 of the ribs 70 to at least in part overlie the grooves, the bristles 45 are clamped in the grooves. As illustrated in FIG. 3, an epoxy 78 may be applied over the deformed teeth and bristles in the groove to facilitate retention of the bristles in the grooves. Alternatively, the epoxy may be applied over the entire surface of the carrier, filling in the grooves to retain the bristles within the grooves and without deforming the rib tips 72. Other types of securement, e.g., welding, may be used to secure metal bristles in the grooves.

Figure 9:
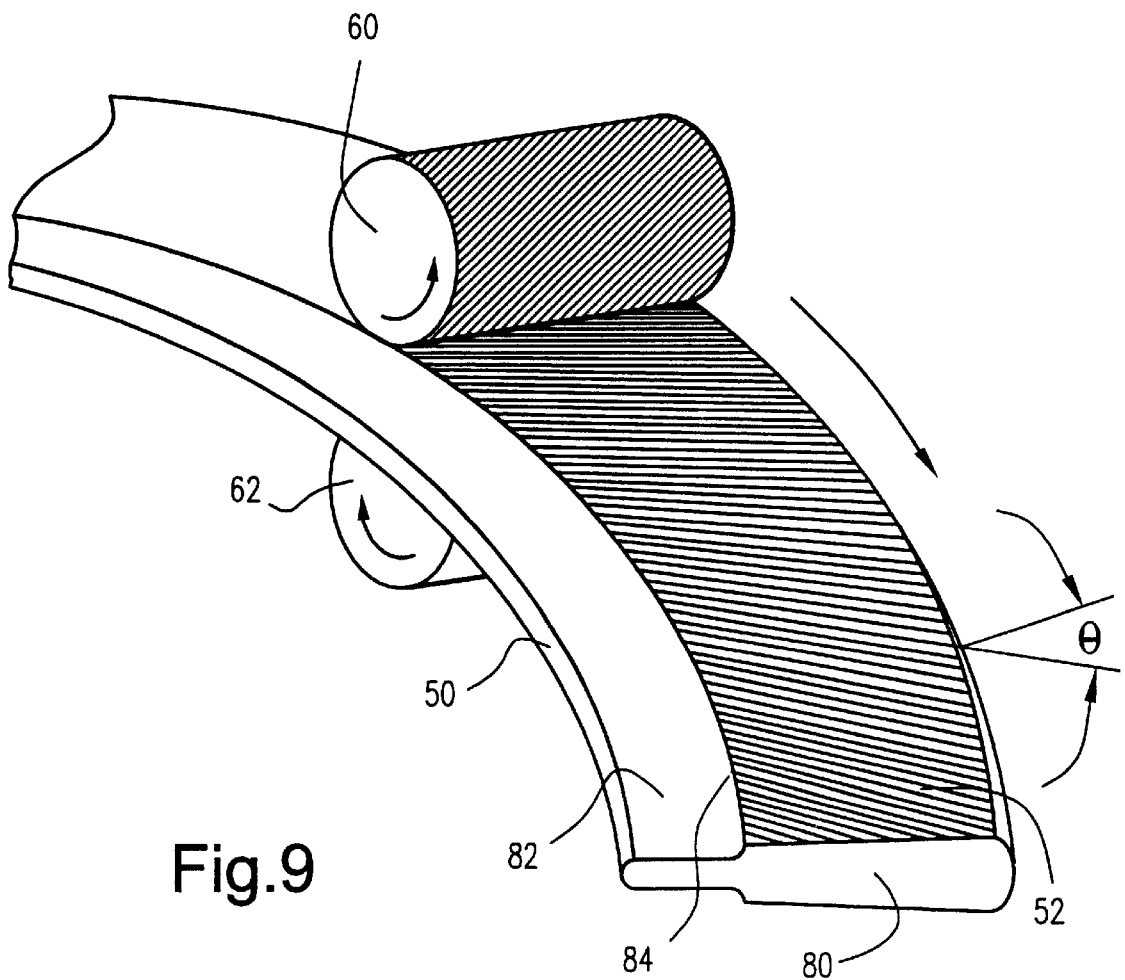
FIG. 9 is a view similar to FIG. 4 illustrating fabrication of a brush seal having a pinchpoint inset from the edge of the carrier.

Referring now to FIG. 9, the bristle-free radial height of the brush seal can be adjusted by machining a length of flat steps or recessing surfaces of the carrier 42 adjacent the edge 50 as desired. In FIG. 9, the carrier 80 thus includes a pair of inset or recessed face portions or surfaces 82 along opposite sides thereof and adjacent the edge 50 which will lie in opposition to the sealing surface. Thus, the bristles are constrained or pinched within the carrier grooves and extend freely from the pinchpoint 84 to the tips of the bristles. That is, portions of the bristles are spaced from the inset faces 82 and thus form a gap with the faces 82. This bristle-free radial height thus affects the bristle stiffness and seal flexibility and can be adjusted by machining the surfaces of the carrier to a greater or lesser distance back from the edge 50.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A brush seal for sealing between adjacent surfaces comprising:
    a brush seal carrier having an array of grooves spaced from one another along a surface thereof and ribs straddling the grooves;
    a plurality of bristles disposed in each said groove between said ribs and having bristle tips projecting from said grooves beyond an edge of the carrier for sealing against a sealing surface; and
    means carried by said carrier overlying the grooves and the bristles therein, including tips of said ribs extending over the grooves for securing the bristles and the carrier to one another.

2. A brush seal according to claim 1 wherein said means includes an epoxy overlying the carrier surface and the bristles in the grooves.

3. A brush seal according to claim 1 wherein said tips of said ribs are bent to overlie the grooves to retain the bristles within the grooves.

4. A brush seal according to claim 3 wherein said means includes a layer of epoxy overlying the carrier surface and the bristles in the grooves.

5. A brush seal according to claim 1 wherein said carrier is arcuate about an axis, said grooves extending at predetermined cant angles relative to radii from said axis to said carrier.

6. A brush seal according to claim 5 wherein the tips of the bristles extend beyond an arcuate edge of said carrier.

7. A brush seal according to claim 5 wherein the carrier has a face portion inset from said surface and said arcuate edge thereof, the face portion being spaced from bristle portions extending from the groove to the bristle tips thereby defining a bristle-free radial height for the bristles between the bristle tips and a pinchpoint for the bristles at the groove ends adjacent the face portion.

8. A brush seal according to claim 1 wherein said carrier has an array of second grooves spaced from one another along a second surface thereof opposite the first-mentioned surface and second ribs straddling the second grooves along said second surface, and a second plurality of bristles disposed in said second grooves between said second ribs and having second bristle tips projecting from said second grooves beyond said carrier edge for sealing against a sealing surface and means carried by said carrier overlying the second grooves and second bristles therein for securing the second bristles and said carrier to one another whereby the first and second bristle tips are spaced axially from one another.

9. A brush seal according to claim 8 wherein the ribs of said second grooves terminate in tips adjacent outer ends thereof, said means including tips of said second ribs extending over said second grooves to retain the second bristles in the second grooves.

10. A brush seal for sealing between adjacent surfaces comprising:
    a brush seal carrier having an array of grooves spaced from one another along a surface thereof and ribs straddling the grooves, said ribs terminating in tips adjacent outer ends thereof;
    a plurality of bristles disposed in said grooves between said ribs and having bristle tips projecting from said grooves beyond an edge of the carrier for sealing against a sealing surface; and
    said tips of said ribs extending over the grooves to clamp the bristles in the grooves.

11. A method of forming a brush seal having a carrier and a plurality of bristles, comprising the steps of:
    (a) forming a plurality of grooves along a surface of the carrier including forming ribs straddling the grooves having tips;
    (b) locating the plurality of bristles in the grooves with tips thereof projecting beyond an edge of the carrier; and
    (c) securing the bristles in the groove, including forming the tips of the ribs to extend over the grooves to retain the bristles in the grooves.

12. A method according to claim 11 wherein step (c) includes deforming the tips of the ribs in the same direction along said surface to overlie the grooves.

13. A method according to claim 11 wherein step (c) includes passing a roller along the surface of the carrier to deform the tips of the ribs in the same direction along said surface to overlie the grooves.

14. A method according to claim 11 wherein said carrier is arcuate about an axis and step (a) includes forming said grooves along the carrier face at cant angles relative to radii from said axis to said carrier.

15. A method according to claim 11 including forming a recessed surface along said face adjacent said edge such that the bristles extend from said grooves in overlying spaced relation relative to said recessed surface to extend beyond said edge.

16. A method according to claim 11 wherein step (c) includes disposing an epoxy over the carrier face and the bristles in the groove.

17. A method according to claim 11 wherein step (c) includes forming the tips of the ribs in the same direction to extend over the grooves to retain the bristles in the grooves and disposing an epoxy over the carrier and the bristles in the groove.

18. A method according to claim 11 including forming a plurality of grooves along a second surface of said carrier opposite said first surface, locating a plurality of second bristles in said second grooves with tips thereof projecting beyond an edge of said carrier, and securing the second bristles in said second grooves forming first and second arrays of bristles projecting from opposite surfaces of said carrier beyond said carrier edge in spaced relation to one another.

19. A method according to claim 18 including forming ribs straddling the second grooves having tips, and forming the tips of the second ribs to extend over the second grooves to retain the bristles in the second grooves.

20. A method according to claim 19 wherein the step of forming is performed simultaneously on opposite sides of the carrier.

* * * * *